UNITED STATES PATENT OFFICE.

PIERRE EYMARD JAY AND JOHN AUGUSTIN RAFTER, OF MONTREAL, CANADA.

IMPROVEMENT IN THE MANUFACTURE OF CAST-STEEL.

Specification forming part of Letters Patent No. 114,299, dated May 2, 1871.

*To all whom it may concern:*

Be it known that we, PIERRE EYMARD JAY, of the city of Montreal, in the Province of Quebec, Canada, engineer, and JOHN AUGUSTIN RAFTER, of the same place, merchant, have invented and made a new and useful Improvement in the Process of Manufacturing Cast-Steel.

This improvement is for purifying cast-iron and transforming it into a cast-steel of superior quality.

It consists in the use of from eight to ten per cent. of nitrate of soda, of oxide of manganese in the same proportion, of oxide of iron in the proportion of six per cent., and of iron ore in the proportion of three per cent., mixed together and reduced into paste in the form of bricks, which have to be dried; or they may also be used otherwise, the proportion of this mixture being, in weight, about one-tenth part of the iron to be converted into cast-steel.

The aforesaid paste, made and used as above described, is dipped in and placed into from one thousand pounds or more, without any limitation as to quantity, of melted iron previously put in a puddling-furnace to that effect, by means of which the excess of carbon, sulphur, and phosphorus is driven off, and the iron purified and reduced to a cast-steel of a superior quality.

Our process has been practically tested, and as it never failed to give the best of results we are absolutely confident that we have found the necessary ingredients and the proportions in which they ought to be used to make sure and positive the operation of converting iron into a superior quality of cast-steel in the very short space of from four to eight minutes, according to the quantity of convertible metal, and for any quantity from the smallest to the very largest, in the manner thereabove and substantially set forth.

We claim as our invention—

The process herein specified of refining cast-iron and making steel by nitrate of soda and oxide of manganese, both in the proportion of from eight to ten per cent., and of oxide of iron in the proportion of six per cent., and three per cent. of iron ore, and to be dipped and put into the melted iron in a puddling-furnace, as set forth and substantially stated.

Signed by us this 5th day of September, A. D. 1870.

P. E. JAY.
      JOHN A. RAFTER.

Witnesses:
 A. LÉVÊQUE,
 D. MUNRO.